US009625117B2

(12) United States Patent
Saito

(10) Patent No.: US 9,625,117 B2
(45) Date of Patent: Apr. 18, 2017

(54) VEHICLE LAMP

(71) Applicant: KOITO MANUFACTURING CO., LTD., Minato-ku, Tokyo (JP)

(72) Inventor: Norikazu Saito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/890,753

(22) PCT Filed: Apr. 23, 2014

(86) PCT No.: PCT/JP2014/061411
§ 371 (c)(1),
(2) Date: Nov. 12, 2015

(87) PCT Pub. No.: WO2014/185234
PCT Pub. Date: Nov. 20, 2014

(65) Prior Publication Data
US 2016/0091165 A1 Mar. 31, 2016

(30) Foreign Application Priority Data

May 13, 2013 (JP) .................................. 2013-101245

(51) Int. Cl.
*F21S 8/10* (2006.01)
*B60Q 1/068* (2006.01)
*B62J 6/02* (2006.01)

(52) U.S. Cl.
CPC .......... *F21S 48/328* (2013.01); *B60Q 1/0683* (2013.01); *F21S 48/1109* (2013.01);
(Continued)

(58) Field of Classification Search
CPC .. F21S 48/328; F21S 48/1159; F21S 48/1323; F21S 48/147; F21S 48/1109; B60Q 1/0683
See application file for complete search history.

(56) References Cited

U.S. PATENT DOCUMENTS

2013/0051053 A1* 2/2013 Yasuda ................ F21S 48/1109
362/516

FOREIGN PATENT DOCUMENTS

CN 102168814 A 8/2011
CN 102878512 A 1/2013
(Continued)

OTHER PUBLICATIONS

International Search Report dated Jul. 22, 2014 issued by International Searching Authority in counterpart International Application No. PCT/JP2014/061411.
(Continued)

*Primary Examiner* — David V Bruce
(74) *Attorney, Agent, or Firm* — Sughrue Mion, PLLC

(57) ABSTRACT

A vehicle lamp includes a first semiconductor light emitting device, a second semiconductor light emitting device and a heat sink having a device mounting portion on which the first semiconductor light emitting device and the second semiconductor light emitting device are mounted. The heat sink is formed so as to define a lamp compartment which the first semiconductor light emitting device and the second semiconductor light emitting device face and a space which is defined outside the lamp compartment. The device mounting portion has a first device disposing surface and a second device disposing surface on which the first semiconductor light emitting device and the second semiconductor light emitting device are disposed, respectively, and a recess portion which defines a space which is opened towards the space defined outside the lamp compartment.

5 Claims, 4 Drawing Sheets

(52) U.S. Cl.
CPC ....... *F21S 48/1159* (2013.01); *F21S 48/1323* (2013.01); *F21S 48/147* (2013.01); *B62J 6/02* (2013.01)

(56) References Cited

FOREIGN PATENT DOCUMENTS

| | | |
|---|---|---|
| JP | 2004-206947 A | 7/2004 |
| JP | 2011-28906 A | 2/2011 |
| JP | 2011-134637 A | 7/2011 |
| JP | 2011-181240 A | 9/2011 |
| JP | 2013-67339 A | 4/2013 |

OTHER PUBLICATIONS

Written Opinion dated Jul. 22, 2014 issued by International Searching Authority in counterpart International Application No. PCT/JP2014/061411.

Communication dated Dec. 29, 2016 issued by The State Intellectual Property Office of P.R. China in counterpart Chinese Application No. 201480027227.3.

* cited by examiner

VEHICLE LAMP

TECHNICAL FIELD

The present invention relates to a vehicle lamp.

BACKGROUND ART

Conventionally, there are vehicle lamps in which a semiconductor light emitting device such as an LED (Light Emitting Diode) is used as a light source.

For example, Patent Literature 1 below proposes a vehicle lamp in which a plurality of LEDs are mounted as a light source. In the configuration of this vehicle lamp, a strut is connected to a holder to which a heat dissipating fin is bonded, and the plurality of LEDs are mounted on the strut.

PRIOR ART LITERATURE

Patent Literature

Patent Literature 1: JP-A-2004-206947

SUMMARY OF THE INVENTION

Problem that the Invention is to Solve

When a great magnitude of current is supplied to an LED to obtain a high output, an amount of heat generated from the semiconductor light emitting device is increased. Because of this, in the configuration of the vehicle lamp described in Patent Literature 1, heat generated in each of the plurality of LEDs is conducted to the other LED or LEDs by way of the strut, resulting in such a state that the LEDs are heated to high temperatures.

An object of the invention is to provide a vehicle lamp which can restrict a semiconductor light emitting device from being heated to high temperatures.

Means for Solving the Problem

The invention has been made with a view to solving the problem and provides a vehicle lamp, characterized by including:

a plurality of semiconductor light emitting devices; and a heat sink having a device mounting portion where the plurality of semiconductor light emitting devices are mounted, and characterized in that the heat sink is formed so as to define a first space which the semiconductor light emitting devices stand to face and a second space which is different from the first space, and in that the device mounting portion has a plurality of device disposing surfaces where the plurality of semiconductor light emitting devices are individually disposed and a recess portion which defines a third space which is opened towards the second space.

According to the vehicle lamp which is configured as described above, when the semiconductor light emitting devices are turned on, the semiconductor light emitting devices generate heat. The heat generated in the semiconductor light emitting devices is conducted to an interior of the device mounting portion via the device disposing surfaces on the heat sink. Further, part of the heat conducted to the device mounting portion is conducted to an inner wall surface of the recess portion which defines the third space to thereby be dissipated in the third space. Then, the heat dissipated in the third space is dissipated into the second space. In this way, by providing the recess portion in the device mounting portion, the heat generated in the semiconductor light emitting devices is restricted from being conducted to each other by way of the device mounting portion on the heat sink, whereby the semiconductor light emitting devices are restricted from being heated to high temperatures.

In the vehicle lamp of the invention, the recess portion may be formed as deep as rear sides of the semiconductor light emitting devices. According to the vehicle lamp configured in the way described above, in the heat generated in the semiconductor light emitting devices, part of heat which is conducted towards the interior of the device mounting portion by way of the device disposing surfaces is made easy to be dissipated from the third space which is defined by the recess portion, whereby the cooling efficiency of the semiconductor light emitting devices is increased.

In the vehicle lamp of the invention, the heat sink may have a first heat dissipating fin which extends outwards of the lamp, and the first heat dissipating fin may be exposed out of a space which is defined by a lamp body and an outer cover. According to the vehicle lamp configured in the way described above, part of the heat which is conducted to the whole of the heat sink is dissipated from the first heat dissipating fin, whereby the heat dissipating efficiency of the heat sink is increased.

In the vehicle lamp of the invention, the plurality of semiconductor light emitting devices may have a first semiconductor light emitting device and a second semiconductor light emitting device and may include further a first optical member configured to shine light emitted by the first semiconductor light emitting device towards the front of the lamp as a low beam and a second optical member configured to shine light emitted by the second semiconductor light emitting device towards the front of the lamp as at least part of a high beam. According to the vehicle lamp configured in the way described above, even though the vehicle lamp is configured to have the semiconductor light emitting devices mounted thereon to shine the strong light for the low beam and the high beam, since the vehicle lamp is configured to include the recess portion provided in the device mounting portion, it is possible to restrict the semiconductor light emitting devices from being heated to such a high temperature that the respective light emitting efficiencies of the first and second semiconductor light emitting devices are reduced.

In the vehicle lamp of the invention, the device mounting portion may have a second heat dissipating fin which extends towards the front of the vehicle lamp. According to the vehicle lamp configured in the way described above, since part of the heat conducted to the whole of the heat sink is dissipated from the second heat dissipating fin, the heat dissipating efficiency of the device mounting portion can be increased.

Advantage of the Invention

According to the vehicle lamp of the invention, it is possible to provide a vehicle lamp which can restrict semiconductor light emitting devices from being heated to high temperatures.

BRIEF DESCRIPTION OF DRAWINGS

FIGS. 4A and 4B show perspective views illustrating the construction of a heat sink, of which FIG. 4A is a perspective view of the heat sink as viewed from a rear side thereof and FIG. 4B is a perspective view of an opening portion of a recess portion.

MODE FOR CARRYING OUT THE INVENTION

Hereinafter, an embodiment of a vehicle lamp according to the invention will be described by reference to the drawings.

Figure 1:
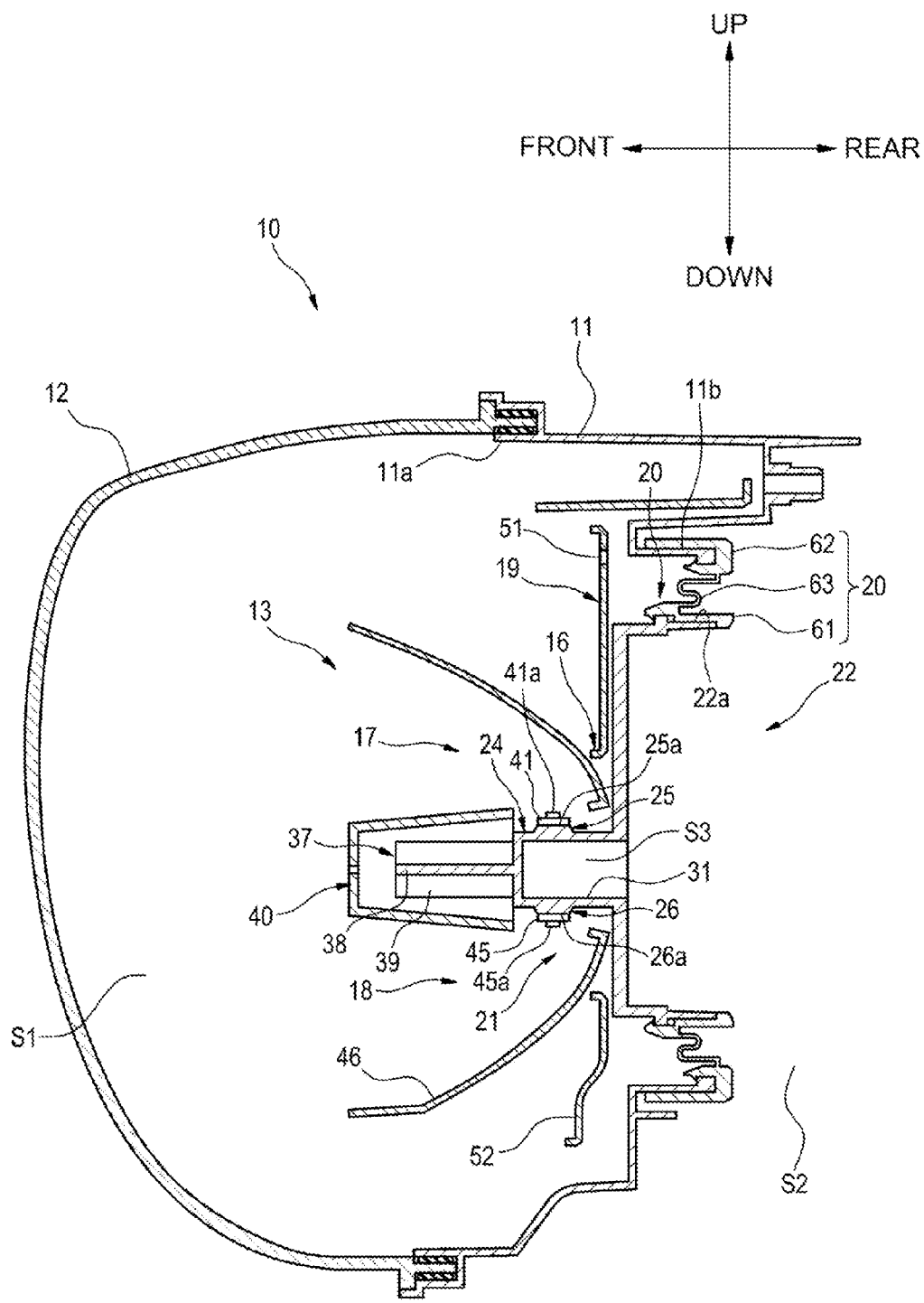
FIG. 1 is a sectional view of a vehicle lamp according to an embodiment of the invention.

FIG. 1 is a sectional view of a vehicle lamp according to an embodiment of the invention.

As shown in FIG. 1, a vehicle lamp 10 according to this embodiment includes a lamp body 11 having an opening portion 11a at a front thereof, a light transmitting outer cover 12 which is mounted so as to cover the opening portion 11a of the lamp body 11, and a lamp unit 13. This vehicle lamp 10 is a vehicle lamp which is used as a headlamp for a vehicle such as a motor cycle and is provided at a front portion of the motorcycle to shine light to the front of the vehicle.

In this embodiment, the front means a side of the vehicle lamp 10 which faces the outer cover 12 (a leftward direction in FIG. 1), and the rear means an opposite side to the front (a rightward direction in FIG. 1).

The outer cover 12 is attached to the lamp body 11 through bonding. A lamp compartment S1 (an example of a first space) is formed in the vehicle lamp 10 by attaching the outer cover 12 to the lam body 11.

The lamp unit 13 includes a heat sink 16, a first light source unit 17, a second light source unit 18 and a bracket 19. Additionally, the lamp unit 13 is attached to the lamp body 11 via a seal member 20.

Figure 2:
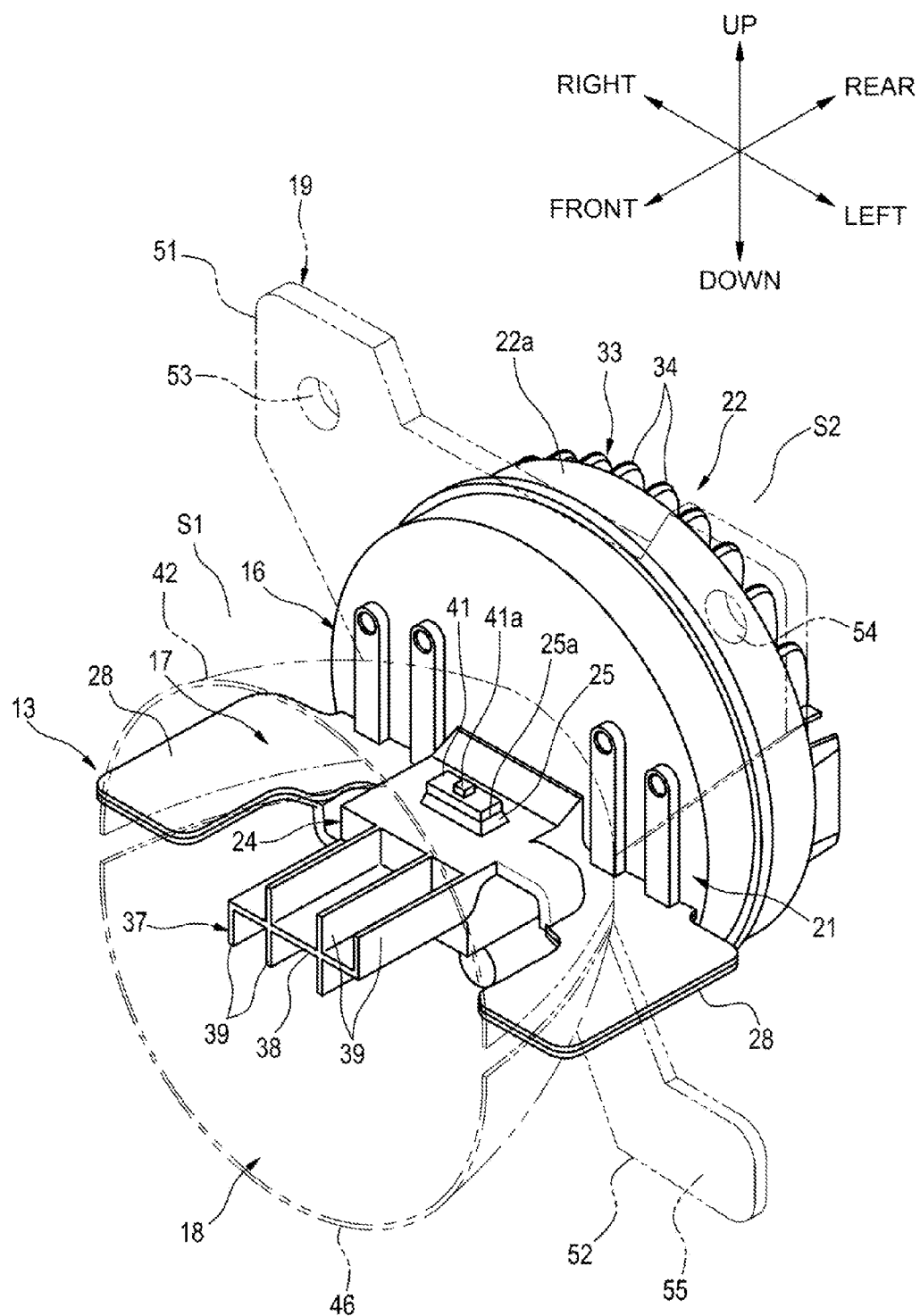
FIG. 2 is a perspective view of a lamp unit which includes a heat sink.

FIG. 2 is a perspective view of the lamp unit which includes the heat sink.

As shown in FIGS. 1 and 2, the heat sink 16 is formed of a metallic material such as aluminum or copper which has superior heat conductivity and has a circular shape when seen from the front thereof. The heat sink 16 is made into a light source unit mounting portion 21 on a front side and is made into a heat dissipating portion 22 on a rear side thereof. This heat sink 16 defines the lamp compartment S1 which is a space which a side of the heat sink 16 which faces the light source unit mounting portion 21 faces and a space S2 (an example of a second space) defined outside the lamp compartment which the other side of the heat sink 16 which faces the heat dissipating portion 22 faces.

A device mounting portion 24 is formed at a central portion on the side of the heat sink 16 which faces the light source unit mounting portion 21 so as to project to the front. Additionally, a support plate portion 28 is provided on each side of the device mounting portion 24 on the side of the heat sink 16 which faces the light source mounting portion 21 so as to extend horizontally.

A first mounting portion 25 is formed on an upper surface side of the device mounting portion 24, and a second mounting portion 26 is formed on a lower surface side thereof. The first mounting portion 25 slightly projects upwards, and an upper portion of the first mounting portion 25 is made into a first device disposing surface (an example of a device disposing surface) 25a which is made up of a smooth surface. The second mounting portion 26 slightly projects downwards, and a lower portion of the second mounting portion 26 is made into a second device disposing surface (an example of the device disposing surface) 26a which is made up of a smooth surface.

The device mounting portion 24 has a second heat dissipating fin 37. This second heat dissipating fin 37 is provided at a front end of the device mounting portion 24 and extends towards the front of the lamp.

The second heat dissipating fin 37 has a horizontal fin 38 which is disposed horizontally and a plurality of vertical fins 39 which extend vertically from an upper surface and a lower surface of the horizontal fin 38. The vertical fins 39 are disposed at intervals in the horizontal direction. These horizontal fin 38 and vertical fins 39 are formed integrally with the device mounting portion 24 of the heat sink 16.

A cap 40 is provided on a side of the second heat dissipating fin 37 which faces the front of the lamp. This cap 40 has a recessed shape which is opened on a rear side thereof. The cap 40 is supported by supporting rods (not shown) which extend from both side portions of the lamp body 11 and is disposed so as to cover the circumference of the second heat dissipating fin 37.

Figure 3A:
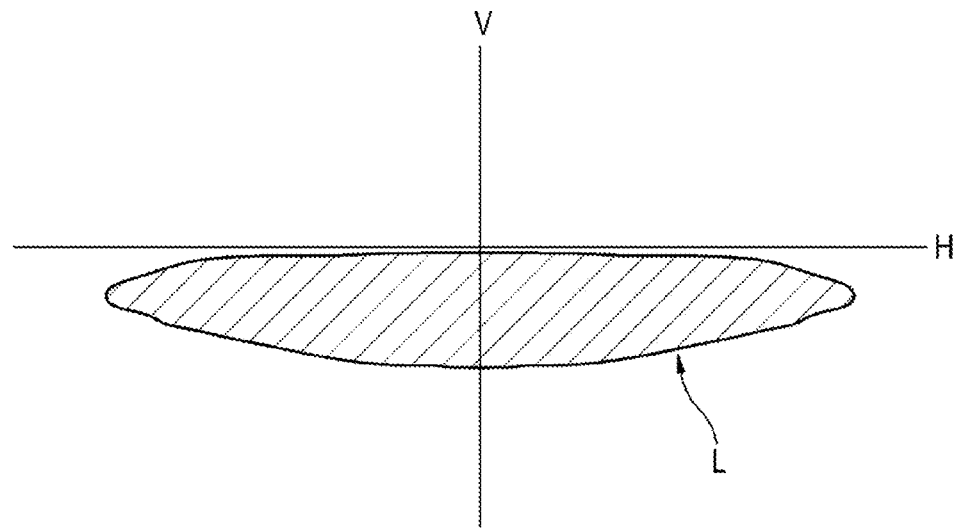
FIG. 3A shows a light distribution pattern which is formed by a first light source unit.

The first light source unit 17 is a light source unit which shines light for a low beam and is configured to form a low beam light distribution pattern L on an imaginary vertical screen disposed ahead of the vehicle (refer to FIG. 3A). The first light source unit 17 is provided on an upper side of the light source unit mounting portion 21 of the heat sink 16. The first light source unit 17 has a first semiconductor light emitting device 41 having a light emitting portion 41a and a first reflector (an example of a first optical member) 42.

The first semiconductor light emitting device 41 is made up of an LED and is fixed to the first device disposing surface 25a of the first mounting portion 25. This allows the light emitting portion 41a of the first semiconductor light emitting device 41 to emit light substantially upwards.

The first reflector 42 has a substantially paraboloidal inner surface which is made up of a free curved surface based on a parabola and is disposed above the first semiconductor light emitting device 41 so as to cover a rear circumference of the first semiconductor light emitting device 41. This first reflector 42 is fixed to the support plate portions 28 which are provided on both the sides of the device mounting portion 24 with screws, whereby the first reflector 42 is supported on the heat sink 16. The first reflector 42 reflects light emitted from the light emitting portion 41a of the first semiconductor light emitting device 41 so as to shine the reflected light to the front of the lamp.

Figure 3B:
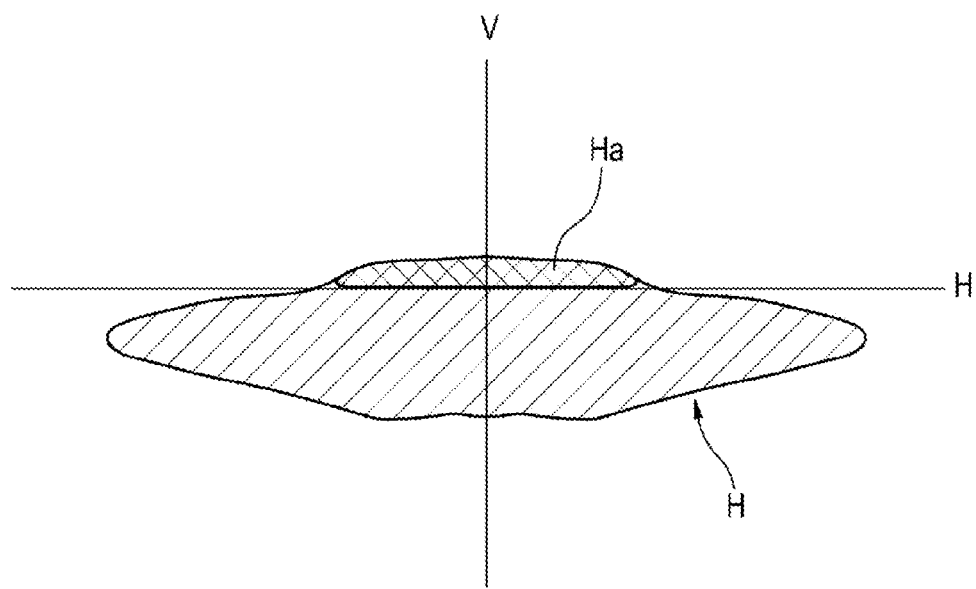
FIG. 3B shows a light distribution pattern which is formed by the first light source unit and a second light source unit.

The second light source unit 18 is a light source unit which shines light for at least a part of a high beam and is configured to form a partial area Ha of a high beam light distribution pattern H on the imaginary vertical screen disposed ahead of the vehicle (refer to FIG. 3B). When both the first light source unit 17 and the second light source unit 18 are turned on, the high beam pattern H is formed. The second light source unit 18 is provided on a lower side of the light source unit mounting portion 21 of the heat sink 16. The second light source unit 18 has a second semiconductor light emitting device 45 having a light emitting portion 45a and a second reflector (an example of a second optical member) 46.

The second semiconductor light emitting device 45 is made up of an LED and is fixed to the second device disposing surface 26a of the second mounting portion 26.

This allows the light emitting portion 45a of the second semiconductor light emitting device 45 to emit light substantially downwards.

The second reflector 46 has a substantially paraboloidal inner surface which is made up of a free curved surface based on a parabola and is disposed below the second semiconductor light emitting device 45 so as to cover a rear circumference of the second semiconductor light emitting device 45. This second reflector 46 is fixed to the support plate portions 28 which are provided on both the sides of the device mounting portion 24 with screws, whereby the second reflector 46 is supported on the heat sink 16. The second reflector 46 reflects light emitted from the light emitting portion 45a of the second semiconductor light emitting device 45 so as to shine the reflected light to the front of the lamp.

The bracket 19 has an upper bracket 51 and a lower bracket 52, and these upper bracket 51 and lower bracket 52 are fixedly screwed to the side of the heat sink 16 which faces the light source unit mounting portion 21. The upper bracket 51 is provided on the upper side of the device mounting portion 24. The upper bracket 51 has two threaded holes 53, 54 which are formed so as to hole a horizontal center of the heat sink 16 therebetween. An aiming screw (not shown), which is supported rotatably on the lamp body 11, is screwed into the threaded hole 53, and a pivot shaft (not shown), which is provided on the lamp body 11, is connected to the threaded hole 54.

The lower bracket 52 is provided on the lower side of the device mounting portion 24. This lower bracket 52 extends leftwards in the horizontal direction of the heat sink 16 while being inclined obliquely downwards, and a leading end of the lower bracket 52 is made into a support portion 55. A threaded hole (not shown) is formed in this support portion 55, and an aiming screw (not shown), which is supported rotatably on the lamp body 11, is screwed into the threaded hole.

In this way, the bracket 19 is supported on the lamp body 11 via a beam axis adjusting mechanism which is made up of the two aiming screws and the pivot shaft. In this optical axis adjusting mechanism, the first light source unit 17 and the second light source unit 18 which are mounted on the heat sink 16 to which the bracket 19 is fixed can be rotated on the pivot shaft as a fulcrum by adjusting screwing amounts of the two aiming screws. Axes of beams which are shone to the front of the lamp from the first light source unit 17 and the second light source unit 18 can be adjusted by rotating the first light source unit 17 and the second light source unit 18 by the beam axis adjusting mechanism.

The seal member 20 includes an inner ring portion 61, an outer ring portion 62 and a seal ring portion 63, and these constituent portions are formed integrally of rubber. The inner ring 61 and the outer ring portion 62 are each formed into an annular shape, and the outer ring 62 is formed larger in diameter than the inner ring portion 61. The seal ring portion 63 is formed into a sheet-like shape is connected to the inner ring portion 61 and the outer ring portion 62 along a circumferential direction. The seal ring portion 63 is curved to be folded back in a radial direction at a plurality of locations.

The heat dissipating portion 22 of the heat sink 16 is fitted in the inner ring portion 61 of the seal member 20. This seals up the inner ring portion 61 and an outer peripheral surface 22a of the heat dissipating portion 22 of the heat sink 16 in a closely contacted fashion. Additionally, a fitting ring portion 11b, which is formed on the lamp body 11 so as to project to the rear, is fitted in the outer ring portion 62 of the seal member 20. This seals up the outer ring portion 62 and the fitting ring portion 11b in a closely contacted fashion.

In the vehicle lamp 10, the seal member 20 seals up a gap between the heat sink 16 and the lamp body 11, and the lamp compartment S1 and the space S2 outside the lamp compartment are defined in a fluid-tight fashion, whereby an interior of the lamp compartment S1 is waterproofed. The seal ring portion 63, which is bent to be folded back in the radial direction of the seal member 20 at the plurality of locations, is deformed when the heat sink 16 is displaced relative to the lamp body 11 by the beam axis adjusting mechanism. This allows the heat sink 16 and the lamp body 11 to be kept sealed up in the closely contacted fashion by the seal member 20 irrespective of the relative displacement of the heat sink 16 and the lamp body 11 by the beam axis adjusting mechanism.

Figure 4A:
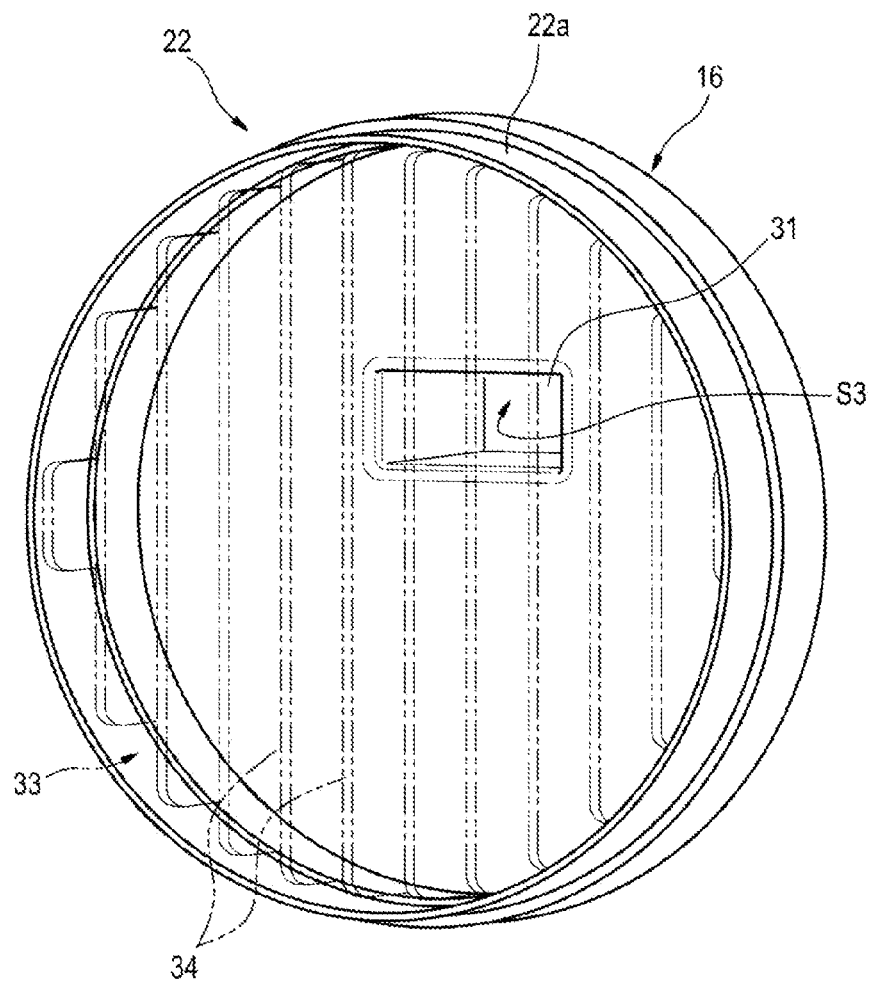
Figure 4B:
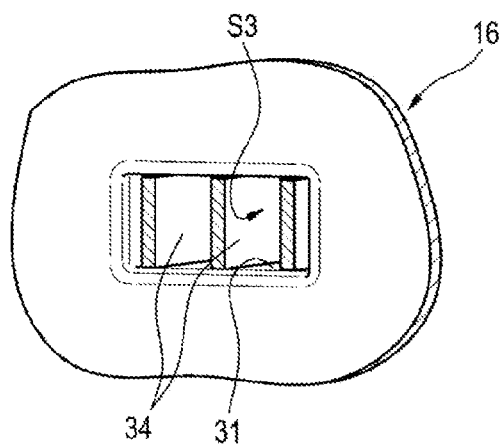

FIG. 4 shows diagrams illustrating the construction of the heat sink, of which FIG. 4A is a perspective view of the heat sink as seen from a rear side thereof, and FIG. 4B is a perspective view of an opening portion in a recess portion.

As shown in FIGS. 1 to 4, the device mounting portion 24 has a recess portion 31 on a rear side thereof, and a space S3 (an example of a third space) is formed on the rear side of the device mounting portion 24 by the recess portion 31 so as to be opened towards the space S2 defined outside the lamp compartment. The recess portion 31 which defines the space S3 is formed as deep as a rear side of each of the first device disposing surface 25a of the first mounting portion 25 and the second device disposing surface 26a of the second mounting portion 26. Then, the recess portion 31 is defined as deep as a rear side of the first semiconductor light emitting device 41 by fixing the first semiconductor light emitting device 41 to the first device disposing surface 25a of the first mounting portion 25. Additionally, the recess portion 31 is defined as deep as a rear side of the second semiconductor light emitting device 45 by fixing the second semiconductor light emitting device 45 to the second device disposing surface 26a of the second mounting portion 26.

Additionally, the heat sink 16 has a first heat dissipating fin 33 which extends towards the rear of the lamp (an example of an outward direction of the lamp) on the side thereof which faces the heat dissipating portion 22. The first heat dissipating fin 33 is exposed to the space S2 which lies outside the lamp compartment S1 which is defined by the lamp body 11 and the outer cover 12.

The first heat dissipating fin 33 is made up of a plurality of heat dissipating fins 34 which are formed integrally on the heat sink 16 so as to extend in a vertical direction, and these fins 34 are provided at intervals in a left-to-right direction. Some of the fins 34 extend into an interior of the recess portion 31, whereby the space S3 in the recess portion 31 is divided in the left-to-right direction by the plurality of fins 34 of the first heat dissipating fin 33 (refer to FIG. 4B). In this way, a wide surface area of an inner surface of the recess portion 31 is ensured by providing some of the fins 34 even in the interior of the recess portion 31.

Next, the function of the vehicle lamp 10 configured in the way described above will be described.

When shining a low beam to the front of the vehicle, only the first semiconductor light emitting device 41 of the first light source unit 17 is turned on. Then, light of the light emitting portion 41a of the first semiconductor light emitting device 41 is reflected by the first reflector 42 to be shone to the front of the lamp.

In addition, when shining a high beam to the front of the vehicle, the first semiconductor light emitting device 41 of the first light source unit 17 and the second semiconductor light emitting device 45 of the second light source unit 18 are turned on. Then, light of the light emitting portion 41a of the first semiconductor light emitting device 41 is reflected by the first reflector 42 to be shone to the front of the lamp, and light of the light emitting portion 45a of the second semiconductor light emitting device 45 is reflected by the second reflector 46 to be shone to the front of the lamp.

As described above, when turning on the first semiconductor light emitting device 41 of the first light source unit 17 and the second semiconductor light emitting device 45 of the second light source unit 18, the first semiconductor light emitting device 41 and the second semiconductor light emitting device 45 generate heat. The heat so generated by the first semiconductor light emitting device 41 and the second semiconductor light emitting device 45 is conducted to the interior of the device mounting portion 24 by way of the first device disposing surface 25a and the second device disposing surface 26b of the heat sink 16. Further, part of the heat conducted to the device mounting portion 24 is conducted to an inner wall surface of the recess portion 31 which defines the space S3 to thereby be dissipated into the space S3. Since the space S3 is opened to the space S2, the heat dissipated into the space S3 is discharged into the space S2.

The heat generated in the first semiconductor light emitting device 41 and the second semiconductor light emitting device 45 and conducted to the device mounting portion 24 of the heat sink 16 is conducted to the whole of the heat sink 16. Then, part of the heat so conducted is discharged from the individual fins 34 of the first heat dissipating fin 33 which extends outwards of the lamp to thereby be exposed to the space S2 into the space S2 which lies outside the lamp compartment S1. Further, another part of the heat conducted to the whole of the heat sink 16 is discharged from the horizontal fin 38 and the vertical fins 39 of the second heat dissipating fin 37 which is provided on the device mounting portion 24 so as to extend to the front of the lamp into the lamp compartment S1.

In this way, according to the vehicle lamp 10 of this embodiment, the heat generated in the first semiconductor light emitting device 41 and the second semiconductor light emitting device 45 is restricted from being conducted to each other via the device mounting portion 24 by providing the recess portion 31 in the device mounting portion 24, whereby the first semiconductor light emitting device 41 and the second semiconductor light emitting device 45 can be restricted from being heated to high temperatures.

In case the recess portion 31 is not formed in the device mounting portion 24, the heat generated in the first semiconductor light emitting device 41 and the second semiconductor light emitting device 45 and conducted to the device mounting portion 24 may be conducted to each other to heat the first semiconductor light emitting device 41 and the second semiconductor light emitting device 45 to high temperatures. According to the vehicle lamp 10 of this embodiment, however, since the surface area of the heat dissipating surface of the device mounting portion 24 is increased by the inner wall surface of the recess portion 31 by the formation of the recess portion 31 in the device mounting portion 24, the heat dissipating efficiency on the rear surface sides of the first device disposing surface 25a and the second device disposing surface 26a of the device mounting portion 24. In this way, the first semiconductor light emitting device 41 and the second semiconductor light emitting device 45 can be cooled well, thereby making it possible to restrict the first semiconductor light emitting device 41 and the second semiconductor light emitting device 45 from being heated to higher temperatures by their own heat by way of the device mounting portion 24.

Additionally, in the vehicle lamp 10 according to this embodiment, it is possible to restrict the light emitting efficiencies of the first semiconductor light emitting device 41 and the second semiconductor light emitting device 45 from being reduced by restricting the first semiconductor light emitting device 41 and the second semiconductor light emitting device 45 from being heated to higher temperatures.

In addition, the recess portion 31 is formed as deep as the rear side of each of the first semiconductor light emitting device 41 and the second semiconductor light emitting device 45. In the heat generated in the first semiconductor light emitting device 41 and the second semiconductor light emitting device 45, part of the heat which is conducted towards the interior of the device mounting portion 24 by way of the first device disposing surface 25a and the second device disposing surface 26a is dissipated easily due to the distance to the rear surfaces of the device disposing surfaces (the inner wall surface of the recess portion 31) being shortened. Additionally, a part of the heat conductive path between the first semiconductor light emitting device 41 and the second semiconductor light emitting device 45 is cut off by the space S3 which is defined by the recess portion 31 of the device mounting portion 24. Therefore, it is possible to enhance the cooling efficiencies of the first semiconductor light emitting device 41 and the second semiconductor light emitting device 45.

In addition, since the first heat dissipating fin 33 is provided on the heat sink 16 so as to be exposed to the outside of the lamp compartment S1, part of the heat conducted to the whole of the heat sink 16 can be discharged from the first heat dissipating fin 33 to thereby enhance further the heat dissipating efficiency of the heat sink 16.

In particular, as in this embodiment, although the vehicle lamp 10 is configured to install the first semiconductor light emitting device 41 and the second semiconductor light emitting device 45 which shine strong light for the low beam and the high beam, since the device mounting portion 24 is configured to include the recess portion 31, it is possible to restrict the first semiconductor light emitting device 41 and the second semiconductor light emitting device 45 from being heated to such a high temperature that the light emitting efficiencies of the first semiconductor light emitting device 41 and the second semiconductor light emitting device 45 are reduced.

Additionally, since the second heat dissipating fin 37 is provided on the device mounting portion 24 so as to extend towards the front of the lamp, part of the heat conducted to the whole of the heat sink 16 can be discharged from the second heat dissipating fin 37, thereby making it possible to enhance the heat dissipating efficiency of the device mounting portion 24.

The invention is not limited to the embodiment that has been described heretofore and hence can be modified or improved as required. In addition, the materials, shapes, dimensions, numeric values, forms, numbers, disposing locations and the like of the constituent elements of the embodiment are arbitrary and hence are not limited to those described therein, as long as the invention can be achieved.

For example, in the embodiment, while some of the vertically extending fins 34 of the first heat dissipating fin 33 are described as extending into the interior of the recess portion 31 so that the space S3 in the recess portion 31 is divided in the left-to-right direction by the fins 34, the invention is not limited thereto. For example, the surface area of the interior of the recess portion 31 may be expanded by providing a fin which extends horizontally in the recess portion 31. Alternatively, no fin is provided in the recess portion 31 so as to realize a reduction in weight of the heat sink.

In addition, in the embodiment, while the lamp compartment S1 and the space S2 defined outside the lamp compartment are described as being defined by the heat sink 16, the invention is not limited thereto. For example, a configuration may be adopted in which the whole of the heat sink is accommodated within a lamp compartment which is defined by the lamp body and the outer cover (that is a space which includes the space denoted by reference character S1 and the space S2). In this configuration, the heat sink may be configured to define a first space which the semiconductor light emitting devices face (for example, a space which a side of the heat sink which faces the front of the lamp faces) and a second space which a side of the heat sink which faces the heat dissipating portion (for example, a space which a side of the heat sink which faces the rear of the lamp faces). In this configuration, the heat sink does not have to divide the lamp compartment into two closed spaces but should divide the lamp compartment into a space lying on the side of the heat sink where the heat sources such as the semiconductor light emitting devices exist and a space lying on the other side where heat generated in the heat sources is discharged.

Additionally, in the embodiment, while the first device disposing surface 25a is formed on the upper surface side of the device mounting portion 24, and the second device disposing surface 26a is formed on the lower surface side of the device mounting 10 portion 24, the invention is not limited thereto. For example, a configuration may be adopted in which a third device disposing surface is provided on a front side of the device mounting portion 24 so that a semiconductor light emitting device such as an LED is mounted thereon without providing the second heat dissipating fin 37 and the cap 40. The number of semiconductor light emitting devices and location or locations 15 where to dispose semiconductor light emitting devices may be determined as required according to functions and applications of lamps to which the invention is applied.

The application of the vehicle lamp 10 according to this embodiment is not limited to the headlamp of the motorcycle, and hence, the vehicle lamp 10 of this embodiment may be provided on a four-wheeled vehicle as a lamp thereof.

While the invention has been described in detail and by reference to the specific embodiment, it is obvious to those skilled in the art to which the invention pertains that various alterations and/or modifications can be made thereto without departing from the spirit and scope of the invention.

This patent application is based on the Japanese Patent Application No. 2013-101245 filed on May 13, 2013, the contents of which are incorporated herein by reference.

DESCRIPTION OF REFERENCE NUMERALS AND CHARACTERS

10 vehicle lamp; 16 heat sink; 24 device mounting portion; 25a first device disposing surface (an example of device disposing surface); 26a second device disposing surface (an example of device disposing surface); 31 recess portion; 33 first heat dissipating fin; 37 second heat dissipating fin; 41 first semiconductor light emitting device (an example of semiconductor light emitting device); 42 first reflector (an example of first optical member); 45 second semiconductor light emitting device (an example of semiconductor light emitting device); 46 second reflector (an example of second optical member); S1 lamp compartment (an example of first space); S2 space outside lamp compartment (an example of second space); S3 space (an example of third space).

What is claimed is:

1. A vehicle lamp, characterized by comprising:
a plurality of semiconductor light emitting devices; and
a heat sink having a device mounting portion where the plurality of semiconductor light emitting devices are mounted, and characterized in that
the heat sink is formed so as to define a first space which the semiconductor light emitting devices stand to face and a second space which is different from the first space, and in that
the device mounting portion has a plurality of device disposing surfaces where the plurality of semiconductor light emitting devices are individually disposed and a recess portion which defines a third space which is opened towards the second space.

2. The vehicle lamp according to claim 1, wherein the recess portion is formed as deep as rear sides of the semiconductor light emitting devices.

3. The vehicle lamp according to claim 1, wherein the heat sink has a first heat dissipating fin which extends outwards of the lamp, and in that
the first heat dissipating fin is exposed out of a space which is defined by a lamp body and an outer cover.

4. The vehicle lamp according to claim 1, wherein the plurality of semiconductor light emitting devices have a first semiconductor light emitting device and a second semiconductor light emitting device and include further:
a first optical member configured to shine light emitted by the first semiconductor light emitting device towards the front of the lamp as a low beam; and
a second optical member configured to shine light emitted by the second semiconductor light emitting device towards the front of the lamp as at least part of a high beam.

5. The vehicle lamp according to claim 1, wherein the device mounting portion has a second heat dissipating fin which extends towards the front of the vehicle.

* * * * *